(12) United States Patent
Takimoto et al.

(10) Patent No.: US 9,097,838 B2
(45) Date of Patent: Aug. 4, 2015

(54) AROMATIC POLYCARBONATE RESIN COMPOSITION AND MOLDED ARTICLES FOR OPTICAL USE WHICH ARE MADE USING SAME

(75) Inventors: Masami Takimoto, Chiba (JP); Naoyuki Kawai, Tokyo (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 596 days.

(21) Appl. No.: 13/520,651

(22) PCT Filed: Nov. 25, 2010

(86) PCT No.: PCT/JP2010/071020
§ 371 (c)(1),
(2), (4) Date: Aug. 15, 2012

(87) PCT Pub. No.: WO2011/083635
PCT Pub. Date: Jul. 14, 2011

(65) Prior Publication Data
US 2012/0309874 A1 Dec. 6, 2012

(30) Foreign Application Priority Data
Jan. 7, 2010 (JP) ................................. 2010-001832

(51) Int. Cl.
| | |
|---|---|
| *C08L 69/00* | (2006.01) |
| *C08L 71/02* | (2006.01) |
| *G02B 1/04* | (2006.01) |
| *C08G 65/20* | (2006.01) |
| *C08K 5/06* | (2006.01) |
| *C08G 64/04* | (2006.01) |
| *C08G 65/08* | (2006.01) |
| *C08G 64/06* | (2006.01) |

(52) U.S. Cl.
CPC ............... *G02B 1/041* (2013.01); *C08G 65/20* (2013.01); *C08K 5/06* (2013.01); *C08L 69/00* (2013.01); *C08L 71/02* (2013.01); *G02B 1/04* (2013.01); *C08G 64/04* (2013.01); *C08G 64/06* (2013.01); *C08G 65/08* (2013.01)

(58) Field of Classification Search
CPC ........ C08G 64/04; C08G 64/06; C08G 65/20; C08G 65/08
See application file for complete search history.

(56) References Cited

U.S. PATENT DOCUMENTS

| | | | |
|---|---|---|---|
| 4,410,572 A | 10/1983 | Sasama et al. | |
| 6,486,570 B1 | 11/2002 | Price et al. | |
| 2007/0129471 A1* | 6/2007 | Miyamoto et al. | ............... 524/88 |
| 2009/0137709 A1* | 5/2009 | Krauter et al. | ................. 524/157 |
| 2011/0112240 A1* | 5/2011 | Krauter et al. | ................. 524/540 |

FOREIGN PATENT DOCUMENTS

| | | |
|---|---|---|
| CN | 1980998 A | 6/2007 |
| JP | 9 20860 | 1/1997 |
| JP | 11 158364 | 6/1999 |
| JP | 2001 208917 | 8/2001 |
| JP | 2001 215336 | 8/2001 |
| JP | 2004 51700 | 2/2004 |
| JP | 2005-96421 A | 4/2005 |
| JP | 2006 169451 | 6/2006 |
| JP | 4069364 | 4/2008 |
| JP | 2008 163070 | 7/2008 |
| JP | 2009 13393 | 1/2009 |

OTHER PUBLICATIONS

NOF Corporation, Comprehensive Catalogue, Oleo & Specialty Chemicals Division, Sep. 19, 2014.*
International Search Report Issued Feb. 8, 2011 in PCT/JP10/71020 Filed Nov. 25, 2010.
Combined Office Action and Search Report issued Jul. 5, 2013 in Chinese patent Application No. 201080059475.8 (with English translation of Category of Cited Documents).
Extended European Search Report issued Jun. 13, 2014, in European Patent Application No. 10842150.4.

* cited by examiner

*Primary Examiner* — Richard A Huhn
(74) *Attorney, Agent, or Firm* — Oblon, McClelland, Maier & Neustadt, L.L.P.

(57) ABSTRACT

Provided are an aromatic polycarbonate resin composition and molded articles for optical use using the same, the resin composition having improved light transmittance and luminance and, at the same time, being able to withstand molding even at a high temperature.
More specifically, provided are the aromatic polycarbonate resin composition and molded articles for optical use using the same, the resin composition comprising 100 parts by mass of an aromatic polycarbonate resin (A) and 0.1 to 5 parts by mass of polyoxytetramethylene-polyoxyethylene glycol (B).

20 Claims, No Drawings

AROMATIC POLYCARBONATE RESIN COMPOSITION AND MOLDED ARTICLES FOR OPTICAL USE WHICH ARE MADE USING SAME

TECHNICAL FIELD

The present invention relates to an aromatic polycarbonate resin composition and molded articles for optical use which are made using the same. More particularly, the present invention relates to an aromatic polycarbonate resin composition which has excellent light transmittance and luminance and can withstand molding even at a high temperature, the resin composition being able to provide molded articles having excellent optical transparency and being useful as molded articles for optical use, especially as a light guide plate; and to molded articles using the same.

BACKGROUND ART

The aromatic polycarbonate has excellent transparency, mechanical properties, thermal properties, electrical properties, weatherability, and the like and, by taking advantage of these characteristics, it is used as molded articles for optical use such as a light guide plate, a lens, an optical fiber, and the like. However, the light transmittance, one of the indicators of transparency thereof, is lower in comparison with polymethyl methacrylate (PMMA) and the like. Therefore, when a surface light source device is constituted from a light guide plate made of an aromatic polycarbonate and a light source, there has been a problem that luminance thereof is low.

Accordingly, there have heretofore been proposed several methods to enhance luminance of a light guide plate made of an aromatic polycarbonate. For example, Patent Literature 1 proposes a method of using a fluorescent bleaching agent and a bead-like cross-linked acrylic resin together, where the fluorescent bleaching agent improves the luminance and the bead-like cross-linked acrylic resin reduces nonuniformity in the luminance; Patent Literature 2 proposes a method of improving light transmittance and the luminance by the addition of an acrylic resin and an alicyclic epoxy; Patent Literature 3 proposes a method of improving the luminance by increasing efficiency of transcription of a concavo-convex pattern on the light guide plate by modifying the molecular terminal of the aromatic polycarbonate; Patent Literature 4 proposes a method of improving the luminance by introducing a copolyester carbonate having an aliphatic segment to increase efficiency of transcription of a concavo-convex pattern on the light guide plate; and the like.

However, in the method of Patent Literature 1, even though the luminance is partially improved, the light transmittance is reduced by the bead-like cross-linked acrylic resin and the fluorescent bleaching agent, resulting in significant reduction of the luminance in portions far from a light source of the light guide plate and making it difficult to obtain uniform luminance. In the method of Patent Literature 2, hue is improved by the addition of the acrylic resin but the light transmittance and the luminance cannot be improved because the aromatic polycarbonate resin becomes clouded; there is a possibility that transmittance is improved by the addition of the alicyclic epoxy but no improvement in the hue is observed. In the case of methods of Patent Literature 3 and Patent Literature 4, improvement effects in fluidity and transcription efficiency can be expected but there is a drawback that heat resistance deteriorates.

On the other hand, in the method of Patent Literature 5, the light transmittance and the luminance are improved by the addition of a polyoxyalkylene glycol or a fatty acid ester thereof, the glycol comprising mainly polyethylene glycol or polypropylene glycol. However, because heat resistance of the polyoxyalkylene glycol is low, molding at a temperature exceeding 320° C. or a long molding cycle causes severe yellowing and significant deterioration of the luminance and the light transmittance, thus causing a fear of adverse effects on the optical performance of the light guiding products. Furthermore, when molding is carried out at a temperature exceeding 340° C., decomposition gas of the polyoxyalkylene glycol causes occurrence of silver streaks on the surface of the molded article, making it impossible to fulfill its function as a light guiding product. For this reason, there is a restriction against raising temperature in order to improve fluidity, making it difficult to mold a thin and large-area light guide plate. Thus, use of the conventional aromatic polycarbonate has been limited to a molding compound for some small-sized light guide plate, which is molded at a low temperature around 280° C. Thus, the range of practical use of the aromatic polycarbonate has been narrow and insufficient.

Further, the methods disclosed in Patent Literature 6 and Patent Literature 7 comprise the addition of phenolic antioxidants and fluorescent whitening agents to the resin composition of Patent Literature 5, which are effective in decreasing occurrence of silver streaks but are ineffective in improving the yellowing problem. In this respect, the temperature at which molding can be performed is not much different from that in Patent Literature 5.

PRIOR ART DOCUMENTS

Patent Documents

[Patent Document 1] JP-A-09-020860
[Patent Document 2] JP-A-11-158364
[Patent Document 3] JP-A-2001-208917
[Patent Document 4] JP-A-2001-215336
[Patent Document 5] JP-B-4069364
[Patent Document 6] JP-A-2008-163070
[Patent Document 7] JP-A-2009-013393

SUMMARY OF INVENTION

Technical Problem

An object of the present invention is to provide an aromatic polycarbonate resin composition and molded articles for optical use using the same, the resin composition having improved light transmittance and luminance and, at the same time, having its lack of heat resistance, a defect encountered when using a polyoxyalkylene glycol or a fatty acid ester thereof, improved to such an extent as to withstand molding at a high temperature.

Solution to Problem

The present inventors conducted diligent research and, as a result, found that the above-described object can be accomplished by using a polyoxyalkylene glycol derivative obtained by copolymerization between a specific combination of polyoxyalkylene glycols. This finding has led to completion of the present invention.

That is, the present invention provides the following aromatic polycarbonate resin composition and molded articles for optical use using the same.
1. An aromatic polycarbonate resin composition, comprising 100 parts by mass of an aromatic polycarbonate resin (A) and 0.1 to 5 parts by mass of polyoxytetramethylene-polyoxyethylene glycol (B) represented by the following general formula (I):

$$HO(CH_2CH_2CH_2CH_2O)_m(CH_2CH_2O)_nH \quad (I)$$

wherein, m and n each independently represent an integer from 4 to 60; and (m+n) is an integer from 20 to 90.

2. The aromatic polycarbonate resin composition according to above-described Item 1, further comprising an antioxidant (C) in an amount of 0.005 to 0.4 part by mass relative to 100 parts by mass of the aromatic polycarbonate resin (A).

3. The aromatic polycarbonate resin composition according to above-described Item 2, wherein the antioxidant (C) is a combination of 0.005 to 0.2 part by mass of a phosphoric antioxidant and 0 to 0.2 part by mass of a hindered phenolic antioxidant.

4. A molded article for optical use, which is obtained by molding the aromatic polycarbonate resin composition according to any of above-described Items 1 to 3.

5. The molded article for optical use according to above-described Item 4, which is a light guide plate.

Advantageous Effects of Invention

According to the present invention, there can be provided an aromatic polycarbonate resin composition and molded articles for optical use using the same, the resin composition having improved light transmittance and luminance and having its lack of heat resistance improved to such an extent as to withstand molding at a high temperature.

DESCRIPTION OF EMBODIMENTS

Aromatic Polycarbonate Resin (A)

The aromatic polycarbonate resin (A) contained in the aromatic polycarbonate resin composition of the present invention is not particularly limited and there can be used those produced by publicly known processes. For example, there can be used a resin produced by reacting a dihydric phenol and a carbonate precursor by a solution process (interfacial polycondensation process) or a molten process (transesterification process); that is, there can be used a resin produced by an interfacial polycondensation process where a dihydric phenol and phosgene are reacted in the presence of a terminal stopper or by a transesterification process and the like where a dihydric phenol and diphenyl carbonate and the like are reacted in the presence of a terminal stopper.

As the dihydric phenol, there may be mentioned many examples including, among others, 2,2-bis(4-hydroxyphenyl)propane[bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ketone, and the like. In addition, there may also be cited hydroquinone, resorcin, catechol, and the like. These may be used each alone or in a combination of two or more kinds. However, of these, bis(hydroxyphenyl)alkanes are preferable, especially suitable being bisphenol A.

As the carbonate precursor, there may be mentioned a carbonyl halide, a carbonyl ester, a haloformate, or the like, including specifically phosgene, dihaloformate of a dihydric phenol, diphenyl carbonate, dimethyl carbonate, diethyl carbonate, and the like.

Meanwhile, in the present invention, the component (A) may have a branched structure and, as branching agent, there may be mentioned 1,1,1-tris(4-hydroxyphenyl)ethane, α,α',α''-tris(4-hydroxyphenyl)-1,3,5-triisopropylbenzene, phloroglycine, trimellitic acid, 1,3-bis(o-cresol), and the like.

As the terminal stopper, there may be used a monocarboxylic acid and a derivative thereof, and a monohydric phenol. For example, there may be mentioned p-tert-butylphenol, p-phenylphenol, p-cumylphenol, p-perfluorononylphenol, p-(perfluorononylphenyl)phenol, p-(perfluorohexylphenyl)phenol, p-tert-perfluorobutylphenol, 1-(p-hydroxybenzyl)perfluorodecane, p-[2-(1H, 1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, 1,1,1,3,3,3-tetrafluoro-2-propanol, and the like.

In the present invention, the viscosity average molecular weight (Mv) of component (A) is usually around 10,000 to 50,000, preferably 13,000 to 35,000, and more preferably 14,000 to 20,000.

In the present invention, this viscosity average molecular weight (Mv) is obtained by measuring the viscosity of a methylene chloride solution at 20° C. by using an Ubbelohde viscometer, obtaining the intrinsic viscosity [η] therefrom, and calculating according to the following equation:

$$[\eta]=1.23\times10^{-5}Mv^{0.83}$$

Polyoxytetramethylene-polyoxyethylene glycol (B)

The polyoxytetramethylene-polyoxyethylene glycol (B) contained in the aromatic polycarbonate resin composition of the present invention is represented by the following general formula (I):

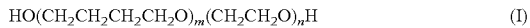

$$HO(CH_2CH_2CH_2CH_2O)_m(CH_2CH_2O)_nH \quad (I)$$

wherein, in the formula (I), m and n each independently represent an integer from 4 to 60; and (m+n) is an integer from 20 to 90. Preferably, m is 10 to 40, n is 10 to 40, and (m+n) is 20 to 80; more preferably m is 15 to 35, n is 15 to 35, and (m+n) is 30 to 70.

If m is less than 4, the ability of the component (B) to raise the light guiding performance becomes low and the heat resistance is also low. If m is larger than 60, the molecular weight becomes high and begins to interfere with light transmittance. If n is less than 4, compatibility of the component (B) with the aromatic polycarbonate resin (A) is poor, resulting in inferior dispersion and unstable light guiding performance. If (m+n) is less than 20, the molecular weight becomes small and, thus, heat resistance becomes poor, the risk of catching fire becomes higher, and handling becomes difficult. If (m+n) becomes larger than 90, the molecular weight becomes large and the component (B) becomes viscous or semisolid; thus, kneading thereof with the aromatic polycarbonate resin (A) becomes difficult and light-transmitting performance becomes unstable.

The weight average molecular weight of the component (B) is about 1,000 to 5,000, preferably 1,500 to 4,000, and more preferably 1,800 to 3,500.

As a conventional technique, it has been disclosed that the light transmittance is improved by the addition of a polyoxyalkylene glycol in JP-B-4069364, JP-A-2008-163070, JP-A-2009-13393, and the like. The polyoxyalkylene glycol used in these techniques includes a polyoxyalkylene glycol comprising an alkyl group having 1 to 3 carbon atoms or a derivative comprising the same and a specific aliphatic.

The polyoxyalkylene glycol comprising an alkyl group having 1 to 3 carbon atoms specifically includes polyoxyethylene glycol and polyoxypropylene glycol. These are polyoxyalkylene glycols containing alkyl groups having a small number of carbon atoms and, therefore, are hydrophilic polymers having good compatibility with a polycarbonate resin. On the other hand, however, this glycol has low heat resistance and the polycarbonate resin to which this was added has drawbacks that, when molded at a temperature exceeding 320° C., the resin shows lowering of the luminance and the light transmittance because of deterioration of the hue; and, when molded at a temperature exceeding 340° C., the resin becomes unable to be used as a light guiding material because of occurrence of the silver streaks due to the decomposition gas.

On the other hand, polyoxytetramethylene glycol containing an alkyl group having 4 carbon atoms, provided that it has a suitable molecular weight, exhibits higher heat resistance than the above-described polyoxyalkylene glycol containing an alkyl group having 1 to 3 carbon atoms. However, with increase in the number of carbon atoms of the former, lipophilicity of the former increases and its compatibility with the polycarbonate resin deteriorates. Consequently, even if this glycol were added alone to the polycarbonate resin, it is difficult to improve transmittance because of difficulties in blending the two and obtaining homogeneous dispersion.

Polyoxytetramethylene-polyoxyethylene glycol (B) used in the present invention is a bifunctional copolymerized polyether obtained by random copolymerization of tetrahydrofuran (THF) and ethylene oxide (EO), represented by the above-described general formula (I), and having a polyether skeleton comprising a tetramethylene glycol chain and an ethylene glycol chain which are copolymerized randomly in an m:n ratio. This copolymerized polyether has a property of polyoxyethylene glycol which has compatibility with the polycarbonate resin and a property of polyoxytetramethylene glycol which has a plasticizing effect for the polycarbonate resin.

The present inventors have discovered that the addition of this copolymerized polyether to the polycarbonate resin improves the light transmittance to a level the same as or better than the polycarbonate resin to which polyethylene glycol and polypropylene glycol were added each independently and, that even when molded at a temperature exceeding 340° C., deterioration of the hue and occurrence of the silver streaks due to the decomposition gas are less liable to occur. Furthermore, the present inventors have found that these effects are due to the action of the copolymerized polyether to lower Tg of the polycarbonate resin and thereby to suppress deterioration of the resin in the kneading process and the molding process. These findings led to the present invention.

In the aromatic polycarbonate resin of the present invention, the content of the component (B) relative to 100 parts by mass of the component (A) is 0.1 to 5 parts by mass, preferably 0.2 to 2.0 parts by mass, and more preferably 0.5 to 1.2 parts by mass. If the content is less than 0.1 part by mass, light transmission performance does not get improved and, therefore, sufficient light transmittance performance cannot be obtained. From a viewpoint of light transmittance performance, the content of the component (B) is preferably 2 parts by mass or less. If the content exceeds 2 parts by mass, increase in the light transmittance becomes moderate and, when the content exceeds 5 parts by mass, the light transmittance, conversely, begins to deteriorate.

In the present invention, as commercially available polyoxytetramethylene-polyoxyethylene glycol (B), for example, the following products may be used suitably:

Polytetramethylene glycol ether/polyoxyethylene glycol random copolymer polyether; m/n=15/15, trade name: "POLYCERIN DC-1800E," manufactured by NOF Corporation, weight average molecular weight=1,800;

Polytetramethylene glycol ether/polyoxyethylene glycol random copolymer polyether; m/n=26/26, trade name: "POLYCERIN DC-3000E," manufactured by NOF Corporation, weight average molecular weight=3,000; and Polytetramethylene glycol ether/polyoxyethylene glycol random copolymer polyether; m/n=10/24, trade name: "POLYCERIN 60DC-1800," manufactured by NOF Corporation, weight average molecular weight=1,800.

Antioxidant (C)

To the aromatic polycarbonate composition of the present invention, it is preferable to add an antioxidant (C).

The light guide plate, for which polycarbonate is widely used, is getting thinner as well as larger and, thus, molding at a high temperature which might exceed 340° C. is generally performed for the purpose of high fluidity. At such a high temperature, even in a polycarbonate resin comprising polyoxytetramethylene-polyoxyethylene glycol with excellent heat resistance, yellowing and emission of the decomposition gas occur because of thermal degradation, thus exerting adverse effects such as deterioration of the transmittance and the hue.

To prevent oxidative degradation of the polycarbonate resin comprising polyoxytetramethylene-polyoxyethylene glycol under such a high temperature environment, usually, a publicly known antioxidant commonly used for a polycarbonate resin is added in an amount of 0.005 to 0.4 part by mass relative to 100 parts by mass of the aromatic polycarbonate resin. Herewith, the above-described adverse effects can be suppressed.

As the publicly known antioxidant used for the polycarbonate resin, there may be mentioned, for example, a phosphoric antioxidant and a hindered phenolic antioxidant described in JP-A-2006-169451.

More specifically, as the phosphoric antioxidant, there may be exemplified the compounds represented by the following structural formula (a-1), structural formula (a-2), and structural formula (a-3):

[Formula 1]

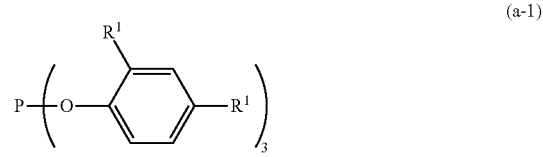

(a-1)

[Formula 2]

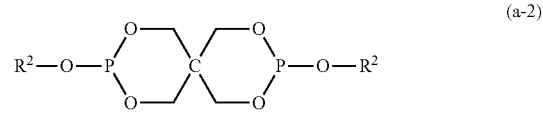

(a-2)

-continued

[Formula 3]

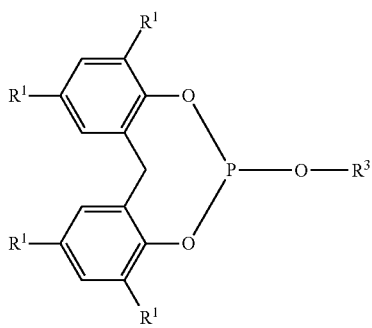
(a-3)

wherein, in the above-described structural formulae (a-1) to (a-3), $R^1$ represents an alkyl group having 1 to 10 carbon atoms (preferably t-butyl group); $R^2$ represents an aromatic group; and $R^3$ represents an alkyl group having 1 to 15 carbon atoms.

In addition, as the hindered phenolic antioxidant, there may be exemplified the compounds represented by the following structural formula (b-1), structural formula (b-2), structural formula (b-3), and structural formula (b-4):

[Formula 4]

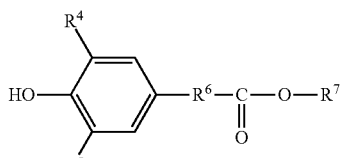
(b-1)

[Formula 5]

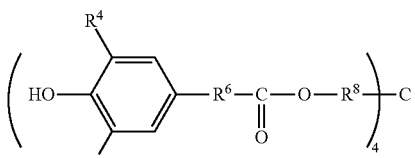
(b-2)

[Formula 6]

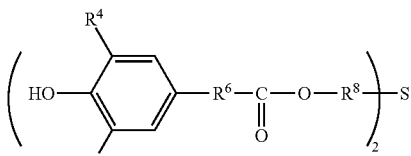
(b-3)

[Formula 7]

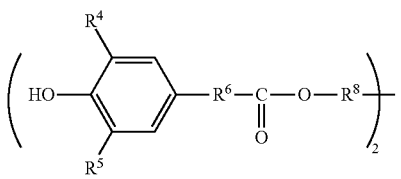
(b-4)

wherein, in the above-described structural formulae (b-1) to (b-4), $R^4$ and $R^5$ each independently represent an alkyl group having 1 to 10 carbon atoms; $R^6$ represents an alkylene group having 1 to 5 carbon atoms; $R^7$ represents an alkyl group having 1 to 25 carbon atoms; and $R^8$ represents an alkylene group having 1 to 5 carbon atoms.

Especially, in the present invention, the present inventors have discovered that combined use of the above-described publicly known phosphoric antioxidant and hindered phenolic antioxidant used for the polycarbonate resin is effective for accomplishing the object of the present invention. Furthermore, in the present invention, it is particularly preferable to use a non-amine hindered phenolic antioxidant as the hindered phenolic antioxidant.

In the present invention, the content of the antioxidant (C) is, relative to 100 parts by mass of the aromatic polycarbonate resin (A), preferably 0.005 to 0.4 part by mass, more preferably 0.02 to 0.3 part by mass, and even more preferably 0.05 to 0.2 part by mass. In addition, when the phosphoric antioxidant and the hindered phenolic antioxidant are used in combination as the component (C), the ratio of contents thereof relative to 100 parts by mass of the component (A) is: preferably, the phosphoric antioxidant is in a range of 0.005 to 0.2 part by mass and the hindered phenolic antioxidant is in a range of 0 to 0.2 part by mass; more preferably, the phosphoric antioxidant is in a range of 0.01 to 0.2 part by mass and the hindered phenolic antioxidant is in a range of 0 to 0.1 part by mass; and even more preferably, the phosphoric antioxidant is in a range of 0.05 to 0.15 part by mass and the hindered phenolic antioxidant is in a range of 0 to 0.05 part by mass.

The phosphoric antioxidant is effective in preventing the oxidative degradation of the polycarbonate resin and especially preferable is a phosphoric antioxidant such as a phosphite ester, a phosphate ester, and the like. If the content of the phosphoric antioxidant is 0.005 part by mass or more, the oxidative degradation of the aromatic polycarbonate during molding at a common molding temperature of 280° C. can be prevented.

On the other hand, in the case of a molding temperature exceeding 280° C., the effect of preventing the oxidative degradation becomes insufficient when the content of the antioxidant is less than 0.005 part by mass; the content is preferably 0.005 part by mass or more in the case of molding at a high temperature exceeding 340° C. However, even in molding at a high temperature exceeding 340° C., the addition of 0.15 part by mass or more of the phosphoric antioxidant alone does not make much difference in the effect of preventing the oxidative degradation and, therefore, the content thereof is preferably 0.2 part by mass or less from a viewpoint of effects and economy.

Furthermore, even though the phosphoric antioxidant is also effective for prevention of the oxidative degradation of polyoxytetramethylene-polyoxyethylene glycol, it cannot suppress the silver streaks due to the oxidative degradation at a molding temperature exceeding 340° C. Therefore, the present inventors conducted investigations and, as a result, found that combined use of polyoxytetramethylene-polyoxyethylene glycol and a hindered phenolic antioxidant, especially, a non-amine hindered phenolic antioxidant, is effective.

Being non-amine, the hindered phenolic antioxidant has little yellowing influence on the aromatic polycarbonate resin and can exert a high antioxidant effect on polyoxytetramethylene-polyoxyethylene glycol. Furthermore, because solubility of the hindered phenolic antioxidant in polyoxytetramethylene-polyoxyethylene glycol is high, the antioxidant efficiency thereof for polyoxytetramethylene-polyoxyethylene glycol is high.

When molding is performed at a molding temperature exceeding 340° C., the content of the hindered phenolic antioxidant used in combination with the above-described phosphoric antioxidant is, relative to 100 parts by mass of the aromatic polycarbonate resin (A), preferably 0 to 0.2 part by mass, more preferably 0 to 0.1 part by mass, and even more preferably 0 to 0.05 part by mass. If the content is 0.2 part by mass or less, the antioxidant itself does not become the cause of deterioration of transparency and the hue.

Meanwhile, in the present invention, when molding is performed under a condition where the molding temperature does not exceed 340° C., no silver streaks due to the oxidative degradation occur and, thus, it is not necessary to particularly add the hindered phenolic antioxidant: the phosphoric antioxidant may be added alone as the antioxidant.

The antioxidant which may be used in the present invention includes, as commercially available antioxidants, "ADK STAB PEP36" (trade name, manufactured by ADEKA Corporation), "IRGAFOS 168" (trade name, manufactured by Ciba Specialty Chemicals Corp.), and the like.

In addition, as commercially available products of the non-amine hindered phenolic antioxidant, there may be mentioned "IRGANOX 1076" (trade name, Ciba Specialty Chemicals Corp.), "IRGANOX 1135" (trade name, Ciba Specialty Chemicals Corp.), "IRGANOX 1010" (trade name, Ciba Specialty Chemicals Corp.), "IRGANOX 245" (trade name, Ciba Specialty Chemicals Corp.), "IRGASTAB PUR 68" (trade name, Ciba Specialty Chemicals Corp.), and the like.

[Additive]

To the aromatic polycarbonate resin composition of the present invention, there may suitably be added a light diffusing agent, polyorganosiloxane, and the like, in addition to the above-described components (A) to (C).

As the light diffusing agent, for example, there may be mentioned one kind or a combination of two or more kinds selected from cross-linked polymethacrylate resin particles, silicone resin particles, silica particles, quartz particles, silica fibers, quartz fibers, and glass fibers.

The polyorganosiloxane is preferably a compound having one or more kinds of functional groups selected from an alkoxy group, an aryloxy group, a polyoxyalkylene group, a carboxyl group, a silanol group, an amino group, a mercapto group, an epoxy group, a vinyl group, and the like.

The amount of the polyorganosiloxane added is, relative to 100 parts by mass of the aromatic polycarbonate resin (A), preferably around 0.01 to 0.15 part by mass, more preferably 0.02 to 0.15 part by mass, and even more preferably 0.05 to 0.1 part by mass. Within the range of 0.01 to 0.15 pat by mass, the polyorganosiloxane, in harmony with other components, can improve the mold releasing property and, further, can greatly decrease occurrence of the silver streaks and adherence of foreign matter on the mold even under a high-temperature molding condition exceeding 340° C., especially under a condition of continuous molding.

The viscosity of the polyorganosiloxane at 25° C. is, from a viewpoint of lubricating effect manifested as the mold releasing property, preferably 10 mm$^2$/s or more and, from a viewpoint of dispersibility in the polycarbonate resin, preferably 200 mm$^2$/s or less. From the above-described viewpoints, the viscosity of the polyorganosiloxane is more preferably in a range of 20 to 150 mm$^2$/s, and even more preferably in a range of 40 to 120 mm$^2$/s.

The difference of the refractive index of the polyorganosiloxane from that of polycarbonate is preferably made as small as possible so that, when the polyorganosiloxane is added to the polycarbonate, transparency of the latter is not lowered. Because the refractive index of the polycarbonate is 1.58, the refractive index of the polyorganosiloxane is desired to be preferably 1.45 or higher, more preferably 1.50 or higher, and even more preferably 1.52 or higher.

[Aromatic Polycarbonate Resin Composition and Molded Articles for Optical Use]

The process for producing the aromatic polycarbonate resin composition of the present invention is not particularly limited.

For example, the above-described components (A) to (C) and, if necessary, the additives are blended and melt-kneaded. Melt-kneading can be carried out by a method usually employed, for example, a method using a ribbon blender, a Henschel mixer, a Banbury mixer, a drum tumbler, a single screw extruder, a biaxial screw extruder, a co-kneader, a multiaxial screw extruder, and the like. The heating temperature at the time of melt kneading is suitably selected usually in a range of about 220 to 300° C.

The aromatic polycarbonate resin composition of the present invention, using the above-described melt-kneaded material or resin pellets obtained as the raw material, can be subjected to a publicly known molding method including, for example, a hollow molding method, an injection molding method, an injection compression molding method, an extrusion molding method, a vacuum molding method, a blow molding method, a press molding method, a pressure molding method, a foam molding method, a heat bending molding method, a compression molding method, a calendar molding method, a rotational molding method, and the like.

The aromatic polycarbonate resin composition of the present invention is one having its lack of heat resistance improved and can withstand molding even at a high temperature exceeding 340° C. Thus, the composition is suitable for a molding method such as the injection molding method and the like, which requires high fluidity of the molding material. On the other hand, by the extrusion molding method, there can be obtained a product of high transparency and high optical property without yellowing, such as a sheet, a film, or the like, by molding at a low temperature of about 220 to 280° C.

The aromatic polycarbonate resin composition of the present invention, having excellent light transmittance and luminance and being a resin composition which can withstand molding even at a high temperature, is especially suited for injection molding. On the other hand, the resin composition has good suitability for low temperature molding and can provide molded articles of excellent light transmission even by molding other than the injection molding; thus the resin composition is useful as molded articles for optical use, especially as a light guide plate.

The light guide plate is not particularly limited and may be a flat plate having a thickness of from several mm to several hundred microns; or it may be a curved plate which have a lens effect or a prism plate obtained by transcription. The molding method is not particularly limited; the shape and the molding method may be suitably selected depending on the purpose and the application.

EXAMPLES

The present invention will be described with reference to Examples, but it should be understood that the invention is not limited to these Examples.

[Component Composition]

Each component used in Examples and Comparative Examples is as follows.

<Aromatic Polycarbonate Resin (A)>
FN 1500A [trade name, manufactured by Idemitsu Kosan Co., Ltd., bisphenol A polycarbonate resin, viscosity average molecular weight=14,500]

<Polyoxytetramethylene-Polyoxyethylene Glycol (B)>

$$HO(CH_2CH_2CH_2CH_2O)_m(CH_2CH_2O)_nH$$

(B-1) POLYCERIN DC-1800E [trade name, manufactured by NOF Corporation, weight average molecular weight=1,800, m=15, n=15]
(B-2) POLYCERIN DC-3000E [trade name, manufactured by NOF Corporation, weight average molecular weight=3,000, m=26, n=26]

<Antioxidant (C)>
Hindered Phenolic Antioxidant
(C-1) IRGANOX 1135 [trade name, manufactured by Ciba Specialty Chemicals Corp.]
(C-2) IRGANOX 1076 [trade name, manufactured by Ciba Specialty Chemicals Corp.]
Phosphoric Antioxidant
(C-3) ADK STAB PEP36 [trade name, manufactured by ADEKA Corporation]

UNISAFE NKL-9520 [trade name, manufactured by NOF Corporation, polypropylene glycol distearate, RCOO($C_3H_6O)_n$OCHRR: $C_{17}H_{35}$]
KR-511 [trade name, manufactured by Shin-Etsu Chemical Co., Ltd., a polyorganosiloxane compound having a phenyl group, a methoxy group, and a vinyl group]

Examples 1 to 13 and Comparative Examples 1 to 9

Each component was blended in a ratio shown in Table 1 and Table 2 and, thereafter, melt-kneaded by a single screw extruder with a vent having a screw diameter of 40 mm ("VS-40" manufactured by Tanabe Plastics Machinery Co., Ltd.) at a cylinder temperature of 260° C. to obtain pellets by strand cutting.

(1) Evaluation Test 1: Residence Thermal Stability Test
The pellets obtained from the above were dried by a circulating hot air dryer at 120° C. for 5 to 7 hours. The dried pellets were subjected to a residence thermal stability test as follows. The pellets were first molded by Toshiba 40N Electric Injection Machine manufactured by Toshiba Machine Co., Ltd.

TABLE 1

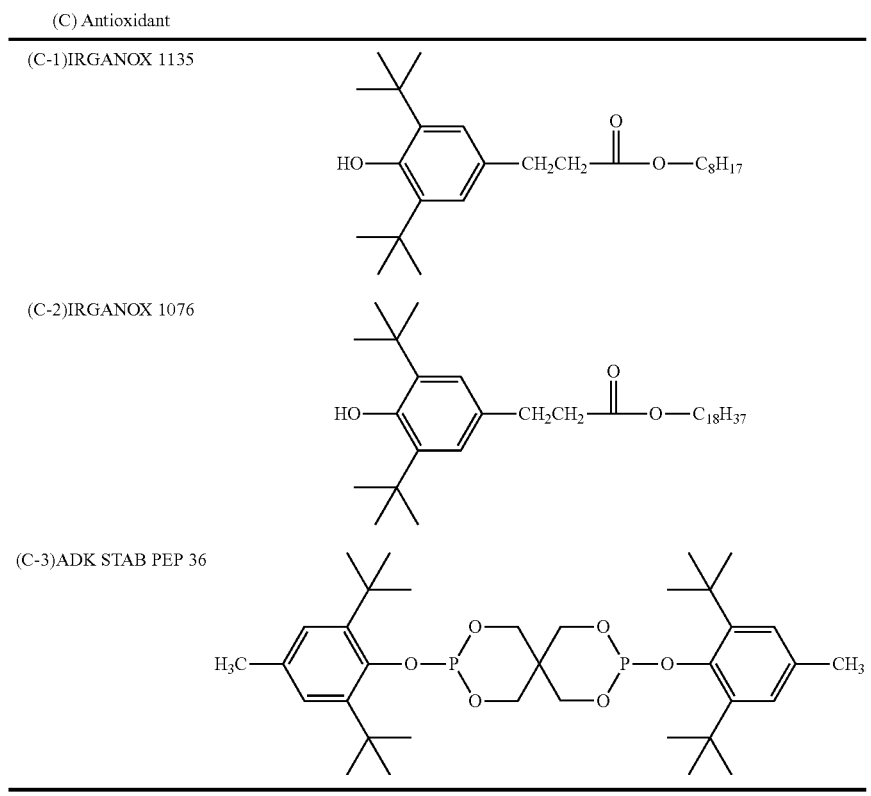

(Others)
Polyoxyalkylene Glycol Other than Component (B)>
Emalgen PP-290 [trade name, manufactured by Kao Corporation, weight average molecular weight=about 9,000, polyoxyethylene-polyoxypropylene, HO($C_3H_6O)_{30}$($CH_2CH_2O)_{160}$H]
PEG 6000P [trade name, manufactured by NOF Corporation, weight average molecular weight=8,800, polyethylene glycol, HO($CH_2CH_2O)_n$H]
PEG 20000 [trade name, manufactured by NOF Corporation, weight average molecular weight=20,000, polyethylene glycol, HO($CH_2CH_2O)_n$H]

using a single cavity mold (the nominal name shall be "residence stability test mold") for a product of 40 mmH×80 mL×3.2 mmT size at a cylinder temperature set at 350° C. with a cycle time of 30 seconds. Thus, molding of 20 shots or more was carried out to stabilize the conditions. Thereafter, molding was performed under a condition of taking out one product every 2.5 minutes and YI of the sample at the fifth shot, which corresponds to the product injected 10 minutes after the start of the molding, was measured.

The heat resistance was expressed in terms of ΔYI which is the difference between the initial YI (the sample of the first shot) and the YI of the product taken out 10 minutes after the start of the molding (the sample at the fifth shot). The results are shown in Table 1 and Table 2. In addition, acceptability criteria are: initial YI is 1.1 or less; and ΔYI is 0.2 or less.

Further, the molded article after the residence thermal stability test of 10 minutes' duration was checked for appearance whether the silver streaks had occurred or not. The results are shown in Table 1 and Table 2. In addition, evaluation was performed based on the following criteria:

Good: occurrence of the silver streaks is not observed at all after a lapse of 10 minutes;

Fair: the amount of occurrence of the silver streaks corresponds to ⅕ of the product surface or less after a lapse of 10 minutes and the silver streaks began to occur at a lapse of 5 minutes or more after the start of the residence thermal stability test; and Poor: the amount of occurrence of the silver streaks corresponds to more than ⅕ of the product surface or the silver streaks began to occur in less than 5 minutes after the start of the residence thermal stability test.

(2) Evaluation Test 2: Light Transmission Test

The pellets obtained from the above were dried by a circulating hot air dryer at 120° C. for 5 to 7 hours. The dried pellets were molded by Toshiba 40N Electric Injection Machine manufactured by Toshiba Machine Co., Ltd. using a family mold (the nominal name shall be "thermal stability mold I") which provides one 1-mm thick molded article, two 2-mm thick molded articles, and one 3-mm thick molded article, each having a square shape of a size of 25 mmH×35 mL, at cylinder temperatures set at 280° C. and 340° C. with a cycle time of 40 seconds.

Using the 3-mm thick square molded article obtained and U-4100 Spectrophotometer manufactured by Hitachi High-Technologies Corporation, YI (Yellowness Index) was determined by use of the following equation. The results are shown in Table 1 and Table 2. In addition, acceptability criteria are: YI at 280° C. is 1.0 or less and YI at 340° C. is 1.2 or less.

$$YI(\text{Yellowness Index}) = 100 \times (1.28X - 1.06Z) \div Y$$

wherein X, Y and Z are three stimulation values in a C light source 2° viewing angle.

In addition, using U-4100 Spectrophotometer manufactured by Hitachi High-Technologies Corporation, transmittance of the article molded at 280° C. was measured at 380 nm which is the lower limit of the visual light, 450 nm, and 600 nm. The results are shown in Table 1 and Table 2. In addition, acceptability criteria are: transmittance at 380 nm is 88% or more; transmittance at 450 nm is 89% or more; and transmittance at 600 nm is 90% or more.

TABLE 1

| | | | Example | | | | | | |
|---|---|---|---|---|---|---|---|---|---|
| | | | 1 | 2 | 3 | 4 | 5 | 6 | 7 |
| Component composition (parts) | Aromatic polycarbonate resin (A) | | 100 | 100 | 100 | 100 | 100 | 100 | 100 |
| | Polyoxytetramethylene-polyoxyethylene glycol (B) | | | | | | | | |
| | (B-1) POLYCERIN DC-1800E | | 1.0 | 0.5 | — | — | — | — | — |
| | (B-2) POLYCERIN DC-3000E | | — | — | 3.0 | 2.0 | 1.5 | 1.5 | 1.0 |
| | Antioxidant (C) | | | | | | | | |
| | (C-1) Hindered phenolic IRGABOX 1135 | | 0.05 | 0.05 | 0.1 | 0.1 | 0.2 | 0.1 | 0.1 |
| | (C-2) Hindered phenolic IRGANOX 1076 | | — | — | — | — | — | — | — |
| | (C-3) Phosphoric ADK STAB PEP36 | | 0.1 | 0.1 | 0.1 | 0.1 | 01 | 0.1 | 0.1 |
| | Polyoxyalkylene glycol | | | | | | | | |
| | Emalen PP-290 | | — | — | — | — | — | — | — |
| | PEG6000P | | — | — | — | — | — | — | — |
| | PEG20000 | | — | — | — | — | — | — | — |
| | UNISAFE NKL-9520 | | — | — | — | — | — | — | — |
| | Polyorganosiloxane KR-511 | | 0.05 | 0.05 | 0.05 | 0.05 | 0.05 | 0.05 | 0.05 |
| Evaluation test | Residence thermal stability test | YI (initial) | 1.031 | 1.055 | 1.055 | 1.001 | 1.050 | 1.000 | 1.011 |
| | | YI (after 10 min) | 1.141 | 1.150 | 1.188 | 1.180 | 1.220 | 1.178 | 1.135 |
| | | ΔYI | 0.110 | 0.095 | 0.133 | 0.179 | 0.170 | 0.097 | 0.124 |
| | | Appearance (silver streaks) | Good | Good | Fair | Good | Good | Good | Good |
| | Light transmittance test | YI (molding at 280° C.) | 0.965 | 0.968 | 0.933 | 0.920 | 0.915 | 0.922 | 0.980 |
| | | YI (molding at 340° C.) | 1.087 | 1.094 | 1.102 | 1.075 | 1.116 | 1.056 | 1.048 |
| | | Transmittance (%) (380 nm) | 88.2 | 88.3 | 88.4 | 88.5 | 88.5 | 88.2 | 88.2 |
| | | Transmittance (%) (450 nm) | 89.5 | 89.5 | 89.6 | 89.6 | 89.7 | 89.5 | 89.5 |
| | | Transmittance (%) (600 nm) | 90.3 | 90.3 | 90.4 | 90.4 | 90.4 | 90.3 | 90.4 |

| | | | Example | | | | | |
|---|---|---|---|---|---|---|---|---|
| | | | 8 | 9 | 10 | 11 | 12 | 13 |
| Component composition (parts) | Aromatic polycarbonate resin (A) | | 100 | 100 | 100 | 100 | 100 | 100 |
| | Polyoxytetramethylene-polyoxyethylene glycol (B) | | | | | | | |
| | (B-1) POLYCERIN DC-1800E | | — | — | — | — | — | — |
| | (B-2) POLYCERIN DC-3000E | | 1.0 | 0.5 | 0.2 | 1.0 | 1.0 | 0.5 |
| | Antioxidant (C) | | | | | | | |
| | (C-1) Hindered phenolic IRGABOX 1135 | | 0.05 | 0.05 | 0.05 | — | — | — |
| | (C-2) Hindered phenolic IRGANOX 1076 | | — | — | — | 0.05 | — | — |
| | (C-3) Phosphoric ADK STAB PEP36 | | 0.1 | 0.1 | 0.1 | 0.1 | 0.1 | 0.1 |

TABLE 1-continued

|  |  |  | | | | | | |
|---|---|---|---|---|---|---|---|---|
| | Polyoxyalkylene glycol | | | | | | | |
| | Emalen PP-290 | | — | — | — | — | — | — |
| | PEG6000P | | — | — | — | — | — | — |
| | PEG20000 | | — | — | — | — | — | — |
| | UNISAFE NKL-9520 | | — | — | — | — | — | — |
| | Polyorganosiloxane KR-511 | | 0.05 | 0.05 | 0.05 | 0.05 | 0.05 | 0.05 |
| Evaluation test | Residence thermal stability test | YI (initial) | 1.026 | 1.095 | 1.100 | 1.000 | 1.033 | 1.100 |
| | | YI (after 10 min) | 1.149 | 1.144 | 1.130 | 1.175 | 1.190 | 1.199 |
| | | ΔYI | 0.123 | 0.049 | 0.030 | 0.176 | 0.157 | 0.099 |
| | | Appearance (silver streaks) | Good | Good | Good | Good | Fair | Good |
| | Light transmittance test | YI (molding at 280° C.) | 0.933 | 0.985 | 1.000 | 0.928 | 1.005 | 1.043 |
| | | YI (molding at 340° C.) | 1.056 | 1.065 | 1.110 | 1.098 | 1.005 | 1.043 |
| | | Transmittance (%) (380 nm) | 88.3 | 88.2 | 88.0 | 88.4 | 88.4 | 88.2 |
| | | Transmittance (%) (450 nm) | 89.6 | 89.5 | 89.3 | 89.6 | 89.6 | 89.5 |
| | | Transmittance (%) (600 nm) | 90.4 | 90.3 | 90.2 | 90.4 | 90.4 | 90.2 |

TABLE 2

| | | | Comparative Example | | | | | | | | |
|---|---|---|---|---|---|---|---|---|---|---|---|
| | | | 1 | 2 | 3 | 4 | 5 | 6 | 7 | 8 | 9 |
| Component composition (parts) | Aromatic polycarbonate resin (A) | | | | | | | | | | |
| | FN1500A | | 100 | 100 | 100 | 100 | 100 | 100 | 100 | 100 | 100 |
| | Polyoxytetramethylene-polyoxyethylene glycol (B) | | | | | | | | | | |
| | (B-1) POLYCERIN DC-1800E | | — | — | — | — | — | — | — | — | — |
| | (B-2) POLYCERIN DC-3000E | | — | — | — | — | — | — | — | 8.0 | 0.005 |
| | Antioxidant (C) | | | | | | | | | | |
| | (C-1) Hindered phenolic IRGABOX 1135 | | 0.05 | 0.05 | 0.05 | 0.05 | — | — | — | 0.05 | 0.05 |
| | (C-2) Hindered phenolic IRGANOX 1076 | | — | — | — | — | — | — | — | — | — |
| | (C-3) Phosphoric ADK STAB PEP36 | | 0.1 | 0.1 | 0.1 | 0.1 | 01 | 0.1 | 0.1 | 0.1 | 0.1 |
| | Polyoxyalkylene glycol | | | | | | | | | | |
| | Emalen PP-290 | | 1.0 | — | — | — | — | — | — | — | — |
| | PEG6000P | | — | 1.0 | — | — | 0.05 | — | — | — | — |
| | PEG20000 | | — | — | 1.0 | — | — | 0.05 | — | — | — |
| | UNISAFE NKL-9520 | | — | — | — | 1.0 | — | — | 0.05 | — | — |
| | Polyorganosiloxane KR-511 | | 0.05 | 0.05 | 0.05 | 0.05 | 0.05 | 0.05 | 0.05 | 0.05 | 0.05 |
| Evaluation test | Residence thermal stability test | YI (initial) | 1.285 | 1.388 | 1.085 | 1.001 | 1.225 | 1.174 | 1.053 | 1.555 | 1.095 |
| | | YI (after 10 min) | 7.769 | 7.599 | 2.356 | 1.388 | 5.809 | 1.553 | 1.322 | 1.955 | 1.175 |
| | | ΔYI | 6.484 | 4.584 | 1.271 | 0.387 | 4.584 | 0.380 | 0.269 | 0.400 | 0.080 |
| | | Appearance (silver streaks) | Poor | Poor | Poor | Poor | Poor | Poor | Poor | Poor | Good |
| | Light transmittance test | YI (molding at 280° C.) | — | — | 0.973 | 1.000 | 0.973 | 0.989 | 1.011 | 1.505 | 1.045 |
| | | YI (molding at 340° C.) | — | — | 1.266 | 1.102 | 1.391 | 1.133 | 1.015 | 1.755 | 1.099 |
| | | Transmittance (%) (380 nm) | — | — | 87.9 | 87.9 | 88.3 | 88.0 | 88.0 | 80.0 | 87.5 |
| | | Transmittance (%) (450 nm) | — | — | 89.5 | 89.5 | 89.5 | 89.4 | 89.4 | 87.0 | 89.2 |
| | | Transmittance (%) (600 nm) | — | — | 90.3 | 90.3 | 90.2 | 90.2 | 90.1 | 89.0 | 90.1 |

INDUSTRIAL APPLICABILITY

The aromatic polycarbonate resin composition of the present invention has excellent light transmittance and luminance, and is a resin composition which can withstand molding even at a high temperature. Therefore, the molded articles thereof are useful as those for optical use, especially as a light guide plate. Meanwhile, the resin composition is useful as an optical material for low-temperature molding.

The invention claimed is:

1. An aromatic polycarbonate resin composition, comprising 100 parts by mass of an aromatic polycarbonate resin (A) and 0.1 to 5 parts by mass of polyoxytetramethylene-polyoxyethylene glycol (B), wherein the polyoxytetramethylene-polyoxyethylene glycol (B) is represented by the following general formula (I):

$$\text{HO}(CH_2CH_2CH_2CH_2O)_m(CH_2CH_2O)_nH \quad (I)$$

wherein, m and n each independently represent an integer from 4 to 60; and (m+n) is an integer from 20 to 90.

2. The aromatic polycarbonate resin composition according to claim 1, further comprising an antioxidant (C) in an amount of 0.005 to 0.4 part by mass relative to 100 parts by mass of the aromatic polycarbonate resin (A).

3. The aromatic polycarbonate resin composition according to claim 2, wherein the antioxidant (C) is a combination of 0.005 to 0.2 part by mass of a phosphoric antioxidant and 0 to 0.2 part by mass of a hindered phenolic antioxidant.

4. A molded article obtained by molding the aromatic polycarbonate resin composition according to claim 1.

5. The molded article according to claim 4, wherein the molded article is a light guide plate.

6. A molded article obtained by molding the aromatic polycarbonate resin composition according to claim 2.

7. A molded article obtained by molding the aromatic polycarbonate resin composition according to claim 3.

8. The aromatic polycarbonate resin composition according to claim 1, wherein the aromatic polycarbonate resin (A) has an average molecular weight (Mv) in a range of from 10,000 to 50,000.

9. The aromatic polycarbonate resin composition according to claim 1, wherein each of m and n is an integer from 10 to 40.

10. The aromatic polycarbonate resin composition according to claim 1, wherein the polyoxytetramethylene-polyoxyethylene glycol (B) has an average molecular weight (Mv) in a range of from 1,000 to 5,000.

11. The aromatic polycarbonate resin composition according to claim 1, comprising 100 parts by mass of an aromatic polycarbonate resin (A) and 0.2 to 2.0 parts by mass of polyoxytetramethylene-polyoxyethylene glycol (B).

12. The aromatic polycarbonate resin composition according to claim 1, further comprising an antioxidant (C) in an amount of 0.02 to 0.3 part by mass relative to 100 parts by mass of the aromatic polycarbonate resin (A).

13. The aromatic polycarbonate resin composition according to claim 2, wherein the antioxidant (C) is a combination of 0.01 to 0.2 part by mass of a phosphoric antioxidant and 0 to 0.1 part by mass of a hindered phenolic antioxidant.

14. The aromatic polycarbonate resin composition according to claim 1, wherein the aromatic polycarbonate resin composition comprises a light diffusing agent.

15. The aromatic polycarbonate resin composition according to claim 1, wherein the aromatic polycarbonate resin composition comprises one or more of cross-linked polymethacrylate resin particles, silicon resin particles, silica particles, quartz particles, silica fibers, quartz fibers and glass fibers.

16. The aromatic polycarbonate resin composition according to claim 1, wherein the aromatic polycarbonate resin composition comprises polyorganosiloxane.

17. The aromatic polycarbonate resin composition according to claim 1, wherein the aromatic polycarbonate resin composition comprises polyorganosiloxane comprising one or more functional groups selected from the group consisting of an alkoxy group, an aryloxy group, a polyoxyalkylene group, a carboxyl group, a silanol group, an amino group, a mercapto group, an epoxy group, and a vinyl group.

18. The aromatic polycarbonate resin composition according to claim 1, wherein the aromatic polycarbonate resin composition comprises polyorganosiloxane in an amount of 0.01 to 0.15 part by mass relative to 100 parts by mass of the aromatic polycarbonate resin (A).

19. The aromatic polycarbonate resin composition according to claim 1, wherein the aromatic polycarbonate resin composition comprises polyorganosiloxane having a viscosity in a range of from 10 $mm^2$/s to 200 $mm^2$/s.

20. The aromatic polycarbonate resin composition according to claim 1, wherein the aromatic polycarbonate resin composition comprises polyorganosiloxane having 1.45 or higher of refractive index.

\* \* \* \* \*